United States Patent

Hug et al.

[11] 3,781,079
[45] Dec. 25, 1973

[54] ALIGNED SCANNING MIRROR
[75] Inventors: Hans A. Hug, Weston; Paul W. Jone, Franklin, both of Mass.
[73] Assignee: Identicon Corporation, Waltham, Mass.
[22] Filed: Feb. 4, 1972
[21] Appl. No.: 223,740

Related U.S. Application Data
[62] Division of Ser. No. 89,250, Nov. 13, 1970, Pat. No. 3,657,792.

[52] U.S. Cl. .................................. 350/7, 350/299
[51] Int. Cl. ............................................ G02b 17/00
[58] Field of Search .................. 29/407; 350/6, 7, 350/285, 299, 320; 356/150, 153, 154

[56] References Cited
UNITED STATES PATENTS
3,500,234   3/1970   Goedertier ........................ 331/94.5

OTHER PUBLICATIONS

K. Hume, Metrology With Autocollimators, pp. 70-103, 1965, T 50H8, Group 250 Library.

Primary Examiner—Charles W. Lanham
Assistant Examiner—Victor A. DiPalma
Attorney—Charles Hieken

[57] ABSTRACT

In a multifaceted mirror scanner, a mirror attached to a carrier that is precisely positioned receives energy from a collimated beam of light and reflects this energy toward a predetermined target point. The carrier is then deformed, such as by making a dimple near an edge where the mirror should be raised slightly, to deflect the beam so that the reflected image is precisely oriented on the target point.

1 Claim, 2 Drawing Figures

PATENTED DEC 25 1973　　　　　　　　　　　3,781,079
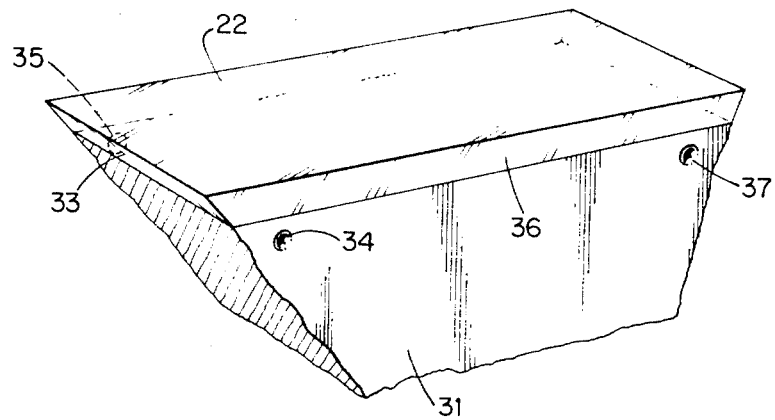
Fig. 2.
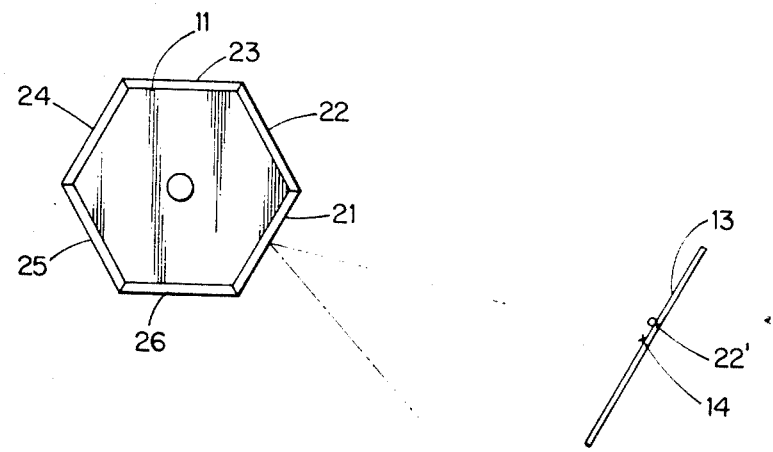
Fig. 1.
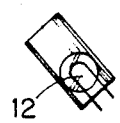

ALIGNED SCANNING MIRROR

This is a division of application, Ser. No. 89,250, filed Nov. 13, 1970, now U.S. Pat. No. 3,647,792, granted Apr. 25, 1972, entitled Scanning Mirror Alignment Techniques.

BACKGROUND OF THE INVENTION

The present invention relates in general to scanning mirror alignment, and more particularly concerns novel apparatus and techniques for establishing precise alignment of the region to be scanned by a multifaceted scanning mirror. The invention is characterized by precise alignment of the different facets so that they scan the same region at relatively large distances while retaining the alignment for long periods of use.

The well-known technique for effecting optical scanning includes a multifaceted rotating mirror interposed between a light source and a photocell. Typically, a light illuminates a half-silvered mirror at an angle of 45° to direct light toward a facet that is reflected from the facet toward the object being scanned. The object reflects this light back along the same path through the half-silvered mirror upon a photocell. The duration of a scan corresponds to the time for a facet to pass the light beam between the object being scanned and the half-silvered mirror. It is preferred that the object path scanned is independent of which facet is then in the light beam path. For short optical path lengths, slight misalignment of the facets is of little practical significance. However, when the distance between the scanning mirror and the object being scanned is many feet, slight misalignment of the facets results in the path of scan changing from one facet to the other. Such a result is especially disadvantageous when scanning labels with an encoded array of narrow stripes. It is desirable to accept a reading only when a number of successive scans indicates the same incoded stripe arrangement. If there is misalignment of the facets, one facet might make a perfect scan of the coded stripes while the next facet would register no scan at all, or only scan a few of the stripes.

Accordingly, it is an important object of the invention to overcome the problem set forth above.

It is a more specific object of the invention to provide a faceted mirror scanner characterized by precise alignment of the facets.

It is another object of the invention to achieve one or more of the preceding object with techniques that precisely determine when alignment is correct.

It is a further object of the invention to achieve precise alignment of the different facets with techniques that are relatively easy to perform and keep the facets properly aligned for long periods with relatively little structure or effort.

SUMMARY OF THE INVENTION

According to the invention, a multifaceted rotating scanner carries a plane reflecting surface on each facet of its periphery. This assembly is then precisely mounted and a predetermined facet illuminated with a collimated beam, such as that provided by a laser, many feet away to produce a reflection on a target point many feet away that is marked. This initial facet is designated as the reference facet, and all other facets, when positioned in the same position as the reference facet, should reflect the collimated light beam to produce a spot on the reference point.

The assembly is then rotated precisely through an angle corresponding to the angle subtended by each facet to expose the next facet to the collimated beam. If the newly positioned facet is perfectly positioned, the image of the light source will again coincide with the reference point where it appeared when the reference facet was exposed.

When the light spot is displaced from the reference point, the plane of the mirror is reoriented slightly until the spot and reference point coincide and then permanently positioned. Preferably, this positioning may be accomplished by tapping the mirror carrier with a center punch near the edge of the mirror surface that needs to be lifted to effect reflection to produce a dimple that raises the mirror and permanently keeps it properly positioned. Alternately, other techniques or devices, such as a press, wedge action or other approach could be used.

These steps are then repeated until each of the facets has been aligned in this manner. The invention embraces the multifaceted mirror assembly made according to the method just described.

Numerous other features, objects and advantages of the invention will become apparent from the following specification when read in connection with the accompanying drawing in which:

BRIEF DESCRIPTION OF THE DRAWING

FIG. 1 is a plan view of an alignment arrangement according to the invention, and FIG. 2 is a perspective view of a single mirror surface and mirror holder or carrier illustrating how indentures or dimples may be employed to raise the reflecting surface of the mirror to the desired plane.

DETAILED DESCRIPTION OF PREFERRED EMBODIMENTS

With reference now to the drawing, and more particularly FIG. 1 thereof, there is shown a plan view of a system for aligning facets according to the invention. A faceted scanning mirror assembly 11 is shown receiving light upon a reference facet 21 from a laser light source 12 and reflecting it back upon a screen 13 to produce a spot on a reference point 14. For simplicity scanning mirror assembly 11 is shown as having six equal facets. However, it may have any number of facets. For simplicity the system is shown in two-dimentions; however, it is apparent that corrections may be made in three dimentions as described below.

Having thus established reference point 14, scanning mirror 11 is rotated through 60° so that facet 22 is exposed to the beam from laser light source 12 to produce a light spot on screen 13 that, in the absence of precise alignment, will be displaced from reference point 14. For example, assume that light spot 22' appears on screen 30 clockwise from reference point 14. This may be accomplished by, for example, raising the counterclockwise edge of facet 22 or lowering its clockwise edge. It is ordinarily more practical to achieve alignment by raising an edge.

The same principles may be applied to correcting misalignment should light spot 22' be above or below reference point 14. Then surface 22 would be tilted downward or upward, respectively, to correct the position of spot 22'.

These steps are repeated until facets 23, 24, 25, and 26 are corrected.

Referring to FIG. 2, there is shown a perspective view of an enlarged portion of the mirror surface 22, for example, on mirror holder or carrier 31, which may be made of metal. Preferably carrier 31 is precision-made so that the facets it presents as mounting surfaces for the individual mirrors are very accurate. However, normal machining tolerances do not provide sufficient accuracy. After the mirror is cemented or otherwise attached to holder 31, its plane may be reoriented slightly by techniques to be described. For example, if it is desired to raise clockwise edge 33, then a pair of dimples 34 and 35 may be formed on opposite sides of mirror holder 31 close to the counterclockwise edge 33 with a center punch, or other suitable means. The depth of the dimple will depend upon the degree of correction required. Initially a light tap may be made on each side with the center punch and a depper punch made if greater deflection is required or additional dimples made slightly further away from edge 33.

If top side 36 need be raised, then the dimple 34 may be included and another 37 added. If opposite tilt is required, then dimples may be made on the opposite face of mirror holder 31. Alternately, raising may be effected by forcing small wedges between the mirror and mirror holder 31 at appropriate places.

Alternate techniques may be suggested to those skilled in the art. For example, an edge could be lowered slightly if it were clamped to the holder more tightly. The preferred approach of raising edges and using dimples is characterized by accurate permanent alignment at negligible cost and without appreciably affecting the balance of the rotating scanning mirror assembly.

Mechanical changes as small as a few millionths of an inch have been easily achieved with the techniques according to the invention and still finer corrections are possible. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

We claim:

1. A precision faceted mirror scanning assembly comprising,
   a multifaceted mirror scanning assembly with each mirror supported by a carrier, the position of at least some of the mirrors on said carrier being adjusted by dimples formed in the mirror carrier near an edge of the mirror thereby raised,
   whereby the image of a light source illuminating a mirror on said assembly occurs at the same place as said assembly is rotated about its axis by the number of degrees subtended by a mirror facet.

* * * * *